US 6,751,232 B1

(12) United States Patent
Patterson et al.

(10) Patent No.: US 6,751,232 B1
(45) Date of Patent: Jun. 15, 2004

(54) METHOD AND APPARATUS FOR COMMUNICATING DATA BETWEEN FIRST AND SECOND PAIRS OF TRANSCEIVERS COMMUNICATING ON A COMMON COMMUNICATIONS LINK (75) Inventors: Douglas Harold Patterson, Richmond (CA); Allan Bogdan Isfan, Ashton (CA); Erik Paul Trounce, Nepean (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/996,251

(22) Filed: Dec. 22, 1997

(51) Int. Cl.⁷ ............... H04J 3/06; H04L 12/43
(52) U.S. Cl. .................. 370/459; 370/503
(58) Field of Search ............ 370/458, 459, 370/433, 437–438, 439, 442, 503, 528, 445, 447; 375/356, 357; 455/500–502, 88

(56) References Cited

U.S. PATENT DOCUMENTS

| 4,107,469 A | * | 8/1978 | Jenkins ............... 179/15 |
| 4,140,877 A | * | 2/1979 | Joslow et al. ............... 179/15 |
| 4,284,848 A | * | 8/1981 | Frost ............... 455/465 |
| 4,807,223 A | * | 2/1989 | Wells ............... 370/85 |
| 4,845,705 A | * | 7/1989 | Dorgelo ............... 370/58 |
| 5,121,385 A | * | 6/1992 | Tominaga et al. ............... 370/80 |
| 5,410,740 A | * | 4/1995 | Hagstrom ............... 455/67.1 |
| 5,436,901 A | * | 7/1995 | Koopman ............... 370/85.1 |
| 5,499,271 A | * | 3/1996 | Plenge et al. ............... 375/295 |
| 5,506,848 A | | 4/1996 | Drakopoulos et al. ..... 370/95.1 |
| 5,535,212 A | * | 7/1996 | Koopman et al. ......... 370/85.6 |
| 5,576,702 A | * | 11/1996 | Samoylenko ............ 340/825.5 |
| 5,619,530 A | * | 4/1997 | Cadd et al. ............... 375/219 |
| 5,696,903 A | | 12/1997 | Mahany ............... 395/200.58 |
| 5,898,685 A | * | 4/1999 | Schnizlein ............... 370/350 |
| 6,028,853 A | * | 2/2000 | Haartsen ............... 370/338 |
| 6,359,899 B1 | * | 3/2002 | Krishnakumar et al. .... 370/444 |

* cited by examiner

Primary Examiner—Alpus H. Hsu
Assistant Examiner—Toan D. Nguyen (57) ABSTRACT

A method and apparatus for combining data from first and second separate data transceivers onto a common data link. The method involves transceiving data at the first data transceiver using the common communications link, at regular intervals of time, and monitoring the common communications link to identify idle periods during which data associated with the first data transceiver is not present. The second data transceiver is synchronized with a corresponding transceiver in communication with the common communications link and communications are established between the second data transceiver and the corresponding transceiver, during the idle periods.

49 Claims, 8 Drawing Sheets

| | | | | |
|---|---|---|---|---|
| 72 → | 0 | SCAN MSG TO CODEC | | |
| | 1 | RESP FROM CODEC | | |
| | 2 | GUARD BAND 1 | | |
| | 3 | NON-PCM | | |
| | 4 | PCM VOICE X24->CODEC | | |
| | 5 | PCM VOICE CODEC->X24 | | |
| | 6 | GUARD BAND 2 | | |
| | 7 | SYNC0 MIX-LUX —120 | ⎱—118 | |
| | 8 | SNYC0 MIX-LUX —122 | ⎰ | |
| | 9 | QUIET | | |
| | 10 | QUIET | —124 | —116 |
| | 11 | QUIET | | |
| | 12 | QUIET | | |
| | 13 | SYNC0 MIX-LUX —120 | ⎱—126 | |
| | 14 | SYNC0 MIX-LUX —122 | ⎰ | |
| | 15 | SYNC0 LUX-MIX | | |
| | 16 | UNUSABLE | | |
| | 17 | UNUSABLE | | —71 |
| | 18 | SYNC0 LUX-MIX | | |
| | 19 | SYNC0 LUX-MIX | | |
| | 20 | SYNC0 LUX-MIX | | |
| | 21 | DATA LUX-MIX | | |
| | 22 | DATA LUX-MIX | | |
| | 23 | DATA LUX-MIX | | |
| | 24 | DATA LUX-MIX | | |
| | 25 | DATA MIX-LUX | | |
| | 26 | DATA MIX-LUX | | |
| | 27 | DATA LUX-MIX | | |
| | 28 | DATA LUX-MIX | | |
| | 29 | DATA LUX-MIX | | |
| | 30 | DATA LUX-MIX | | |
| | 31 | DATA MIX-LUX | | |

METHOD AND APPARATUS FOR COMMUNICATING DATA BETWEEN FIRST AND SECOND PAIRS OF TRANSCEIVERS COMMUNICATING ON A COMMON COMMUNICATIONS LINK

FIELD OF THE INVENTION

This invention relates to line interface circuits used in telephone switching systems, and more particularly to line interface cards capable of handling two types of data, each at a different bit rate. Such two types of data may include both pulse code modulated (PCM) delay-sensitive voice data and general sporadic data such as that acquired from a high speed modem on a dedicated dataline. Such a dedicated dataline may be an asymmetrical digital subscriber loop.

BACKGROUND OF THE INVENTION

Present central office switch architectures include subscriber loop circuits which are terminated in a central office at a main distribution frame. From the main distribution frame, subscriber loop circuits are connected to respective line cards which are connected to a bus interface card. The line cards essentially act to Pulse Code Modulate and demodulate voice data transmitted to and from the subscriber. The bus interface card essentially acts as a many-to-one full-duplex multiplexer which places Pulse Code Modulated (PCM) fragments of the voice data into appropriate time slots on a serial communications channel of a central office switch.

A separate similar arrangement including data line cards and a data bus interface card is used to interface dedicated data lines to a somewhat similar switch, such as an Ethernet switch, to accomplish a similar purpose.

It will therefore be appreciated that under existing central office architectures, two separate systems are required to handle voice and data communications.

Voice data equipment, however, has unused capacity for communications because PCM conversation fragments for a given line card are only transmitted to the bus interface card during a small sub-interval of a cycle period while the PCM conversation fragments of other line cards are being transmitted to the bus interface card during remaining sub-intervals. Thus, there is unused idle time on each line card/bus interface connection.

If this idle time could be used for data, a single, modified line card could be used to simultaneously accept both analog voice information and Quadrature Amplitude Modulation (QAM) data on the subscriber loop, eliminating the need for a separate dataline and eliminating the need for separate equipment to interface a dedicated dataline to the data switch. The present invention addresses this problem.

SUMMARY OF THE INVENTION

In accordance with one aspect of the invention, there is provided a method of communicating data between first and second pairs of transceivers communicating on a common communications link. The method includes the steps of monitoring the common communications link to identify idle periods during which transceivers of the first transceiver pair are not communicating, synchronizing transceivers of the second pair of transceivers for communication with each other, and establishing communications between the transceivers of the second pair during the idle periods.

Preferably, the method includes the step of monitoring which includes the step of detecting an initial synchronization pattern on the common communications link.

Preferably, the method includes the step of synchronizing which includes the step of transmitting a first synchronization message on the common communication link.

Preferably, the method includes the step of transmitting the first synchronization message during the idle periods.

Preferably, the method includes the step of transmitting a second synchronization message a pre-determined time after transmitting the first synchronization message.

Preferably, the method includes the step of detecting the first and second synchronization messages and the pre-determined time between the first and second synchronization messages.

Preferably, the method includes the step of transmitting n sequential reply synchronization messages during the idle periods.

Preferably, the method includes the step of detecting the n sequential reply synchronization messages during the idle periods and determining a value for n.

Preferably, the method includes the step of transmitting the first and second synchronization messages in respective time slots separated by n quiet time slots.

Sequential reply synchronization messages during the idle periods and determining.

Preferably, the method includes the step of comparing the number n of the sequential reply synchronization messages received with the number of the quiet time slots between the first and second synchronization messages to determine whether or not the number n is equal to the number of quiet time slots between the first and second synchronization messages, wherein equality indicates synchronization of the second transceiver with the first transceiver and non-equality indicates lack of synchronization.

Preferably, the method includes the step of establishing communications between the transceivers of the second pair of transceivers which includes the step of transmitting and receiving data on the common communications link while periodically detecting a synchronization maintenance message on the common communications link.

Preferably, the method includes the step of periodically detecting the synchronization maintenance message, which includes the step of determining whether or not the synchronization maintenance message is received at periodic intervals of a first duration.

Preferably, the method includes the step of transmitting a synchronization maintenance message on the common communications link.

In accordance with another aspect of the invention, there is provided an apparatus for communicating data on a common communications link. The apparatus includes a first pair of transceivers communicating with each other on the common communications link at predefined intervals of time, a monitor for monitoring the common communications link to identify idle periods during which data associated with the first pair of transceivers is not present, a second pair of transceivers for transceiving data on the common communications link during the idle periods, and a synchronizer for synchronizing data transceivers of the second pair for communications therebetween.

Preferably, the monitor includes a detector for detecting an initial synchronization pattern on the common data link and preferably, the second transceiver includes the monitor.

Preferably, the synchronizer includes a transmitter for transmitting a synchronization message on the communication link and at least one transceiver of the second pair of transceivers includes the synchronizer. Preferably, at least one transceiver of the second pair of transceivers has the transmitter and preferably, the transmitter transmits the first synchronization message during the idle periods and preferably, the transmitter transmits a second synchronization message a pre-determined time after transmitting the first synchronization message.

Preferably, the apparatus includes a detector for detecting the first and second synchronization messages and the pre-determined time between the first and second synchronization messages.

Preferably, the transmitter transmits n sequential reply synchronization messages during the idle periods.

Preferably, the detector detects the n sequential reply synchronization messages during the idle periods and determines a value for n.

Preferably, the transmitter transmits the first and second synchronization messages in respective time slots separated by n quiet time slots.

The detector detects the n sequential reply synchronization messages during the idle periods and determines.

Preferably, the apparatus includes a processor for comparing the number n of sequential reply synchronization messages received with the number of quiet time slots between the first and second synchronization messages to determine whether or not the number n is equal to the number of quiet time slots between the first and second synchronization messages, wherein equality indicates synchronization of the second transceiver with the first transceiver and non-equality indicates lack of synchronization.

Preferably, the second transceiver includes the detector and the processor.

Preferably, at least one of the transceivers transmits a synchronization maintenance message on the common communications link.

Preferably, the transceivers of the second pair transmit and receive data on the common communications link, while periodically detecting a synchronization maintenance message on the common communications link.

Preferably, the transceiver of the second pair determines whether or not the synchronization maintenance message is received at periodic intervals of a first duration.

Preferably, the data and the synchronization maintenance messages are interleaved.

In accordance with another aspect of the invention, there is provided a method of combining data from first and second separate data transceivers onto a common data link. The method includes the steps of transceiving data at the first data transceiver using the common communications link at regular intervals of time, monitoring the common communications link to identify idle periods during which data associated with the first data transceiver is not present, synchronizing the second data transceiver with a corresponding transceiver in communication with the common communications link, and establishing communications between the second data transceiver and the corresponding transceiver during the idle periods.

In accordance with another aspect of the invention, there is provided an apparatus for communicating data on a common data link. The apparatus includes a first data transceiver for transceiving data on the common communications link at regular intervals of time, a monitor for monitoring the common communications link to identify idle periods during which data associated with the first data transceiver is not present, a second data transceiver for transceiving data on the common communications link during the idle periods, and a synchronizer for synchronizing the second data transceiver with a corresponding transceiver in communication with the common communications link.

BRIEF DESCRIPTION OF THE DRAWINGS

In drawings which illustrate embodiments of the invention.

DETAILED DESCRIPTION

Figure 1:
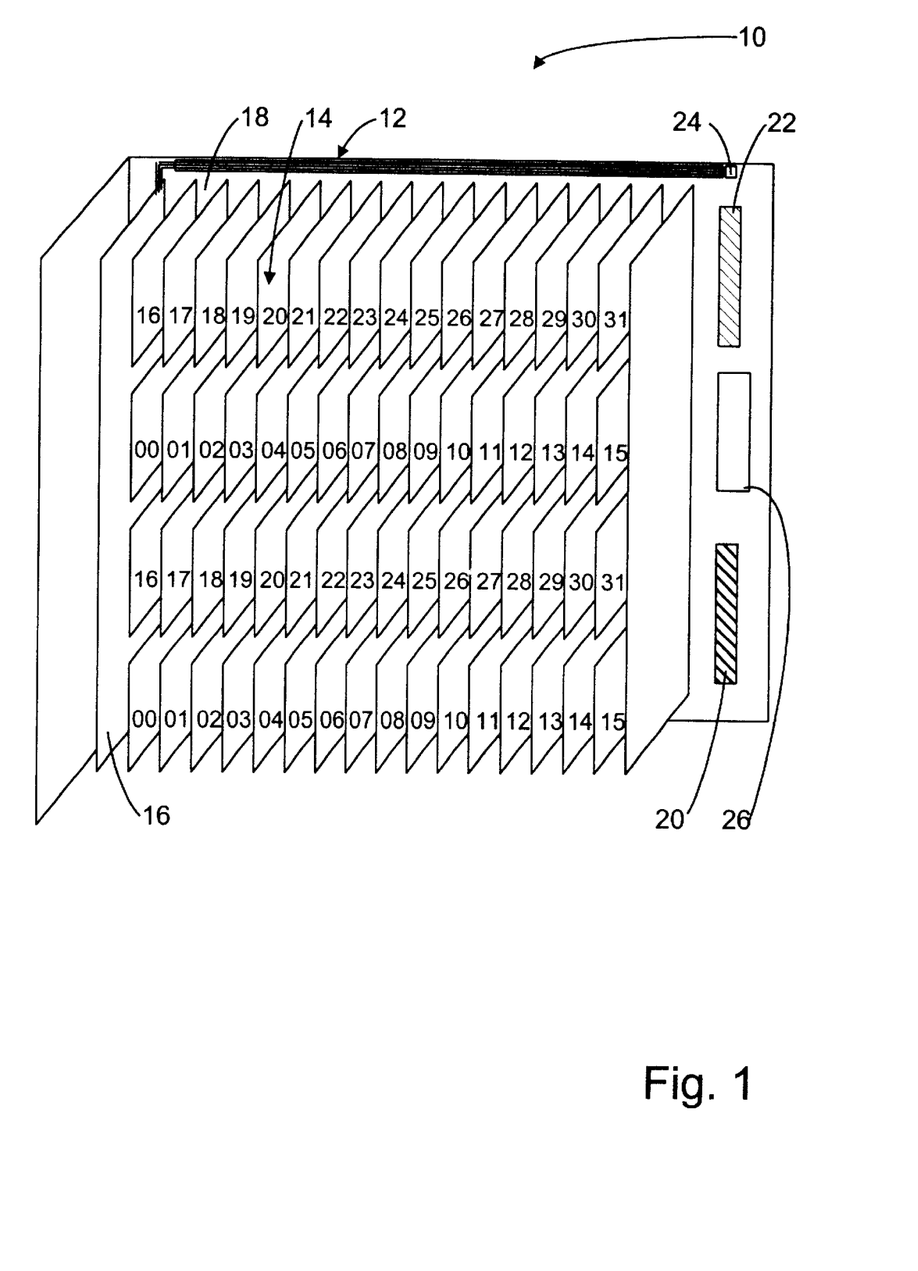
FIG. 1 is a perspective schematic representation of an apparatus according to a first embodiment of the invention.

FIG. 1

Referring to FIG. 1, an apparatus for communicating data on a common communications link, according to a first embodiment of the invention is shown generally at 10. The apparatus includes a Line Concentrating Module drawer 12 installed on a shelf of a digital multiplexed telephone switch, which in this embodiment, is a Nortel DMS 100.

The Line Concentrating Module (LCM) drawer 12 has a plurality of Data Line Cards (DLICs) shown generally at 14, arranged in two banks of 32, a Data Bus Interface Card (DBIC) 16 and a backplane 18. The DLICs 14 and DBIC 16 are connected to the backplane 18. The backplane 18 has a plurality of connectors 20, 22, 24 and 26 for connecting the DLICs 14 to respective subscriber loops, and for connecting the DBIC 16 to shelf processing circuitry seen best in FIG. 2, including an LCM processor 28, a Digroup control card 30 and a 10 base T data network, respectively.

Figure 2:
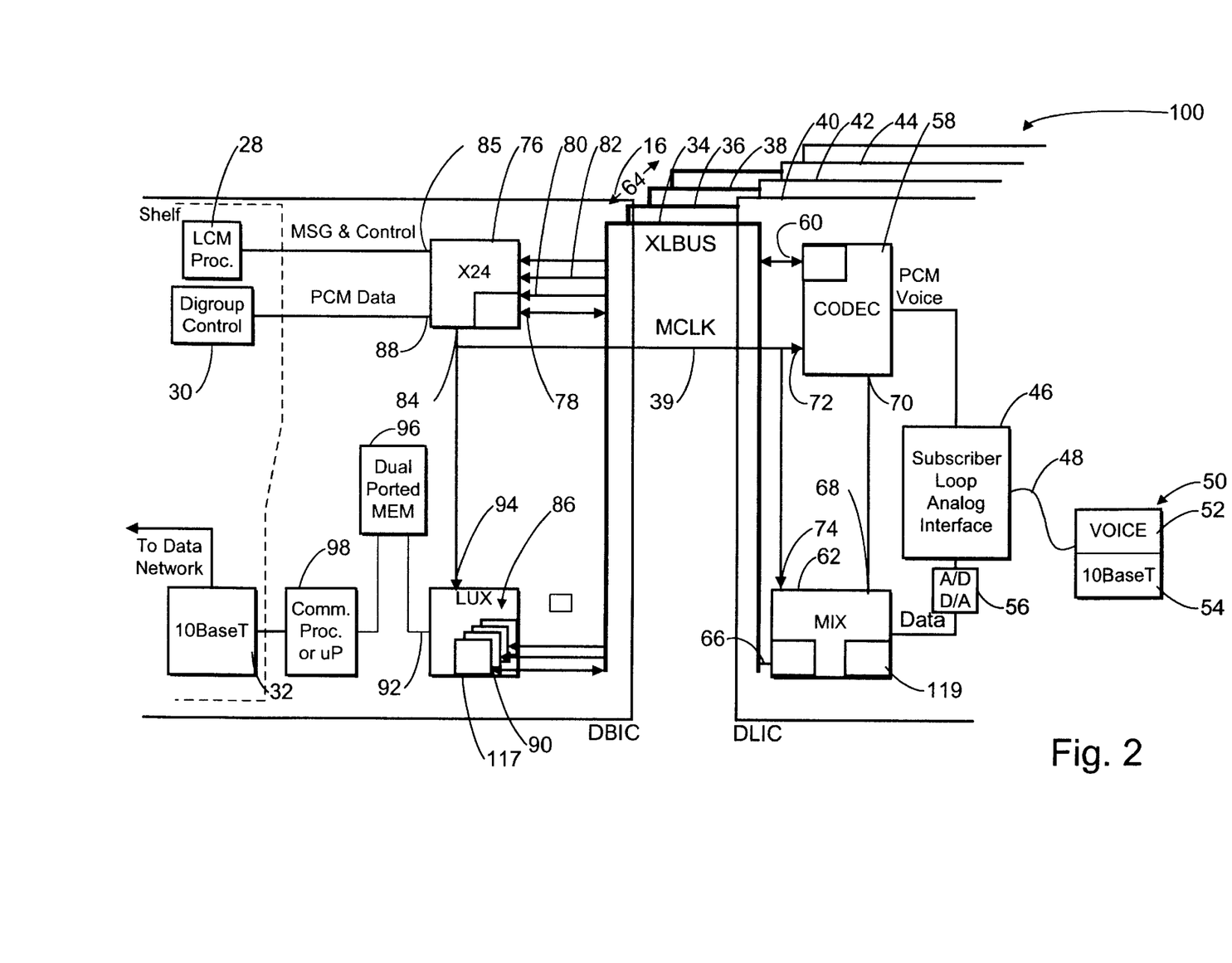
FIG. 2 is a block diagram of the apparatus shown in FIG. 1.

FIG. 2

Referring to FIG. 2, the backplane 18 further includes a plurality of serial buses, which act as common communications links, herein referred to as XLBUSes 34, 36, 38, etc. and a common clock signal line 39, for connecting the DBIC 16 to respective DLICs 40, 42, 44 etc. Respective XLBUSes 34, 36, 38 etc. provide respective serial communications paths between respective DLICS 40, 42, 44 etc. and the DBIC 16.

Each data line interface card 40, 42, 44 etc., has a respective analog subscriber loop interface, only one of which is shown at 46, for communicating over an analog subscriber loop 48 with customer premises equipment 50 having a 10-base T circuit 52 and an analog interface 54. In this embodiment, the analog subscriber loop interface 46 includes a collection of filters and gain stages for conditioning signals received from the customer premises equipment on the analog subscriber loop 48. In this embodiment the customer premises equipment 50 includes an analog loop interface for separating a voice spectrum associated with voice data from a data spectrum associated with 10 base T data, across the analog subscriber loop 48, within the allocated bandwidth.

Data Line Interface Card

Still referring to FIG. 2, the data line interface card 40 further includes a code 58. The code 58 has a tristatable output 60 connected to the XLBUS 34, for transmitting PCM voice signals to the DBIC 16.

The DLIC 14 further includes an analog to digital converter/digital to analog converter unit 56 and a modem interface to XLBUS (MIX) 62. The analog to digital converter unit 56 receives and provides analog signals to the analog subscriber loop interface 46 and receives and provides digital signals to and from the MIX 62. The MIX 62 has a tristatable output 66 connected to the XLBUS 34, for communicating digital signals produced by the MIX 62 thereto. Similarly, digital signals produced by the DBIC 16 are communicated to the MIX 62 on the XLBUS 34 and are converted into (QAM) signals by the MIX 62, forwarded to the D/A 56 and forwarded to the analog subscriber loop interface 46 for transmission on the analog subscriber loop 48 through the analog subscriber loop analog interface 46.

The common clock signal line 39 is also terminated at respective inputs on the code 58 and the MIX 62 to provide a common clocking signal, and the MIX 62 has an output 68 which produces a code output control signal which is received at a control input 70 of the code 58, for selectively controlling the tristate status of output 60.

Generally, the MIX 62 handles 10-base T data on the subscriber loop while the code 58 handles analog telephone data.

Data Bus Interface Card

The data bus interface card includes an X-24 scan application specific integrated circuit (ASIC) 76 having bidirectional terminals 78, 80, 82, etc. for communicating with respective XLBUSes 34, 36, 38, etc. and having a clock output 84 for producing the common clocking signal on the common clock signal line 39 used by the code 58 and the MIX 62.

The X-24 scan ASIC 76 further has a message and control I/O port 85 for producing and receiving message and control signals which are communicated to and from the LCM processor 28. The X-24 scan ASIC 76 further has a PCM data input/output 88 for producing and receiving PCM data signals which are communicated to and from the Digroup control card 30. The X-24 scan ASIC 76 is effectively a PCM multiplexer/demultiplexer for multiplexing and demultiplexing PCM streams between the Digroup and the individual linecards. The X-24 scan ASIC 76 also acts to poll the DLICs 40, 42 44, etc., to detect off-hook conditions at the analog subscriber loop interface 46. The X-24 communicates with the code 58 on the DLIC and, therefore, the X-24 and code act as a first pair of transceivers communicating with each other on the common communications link at predefined intervals of time.

The DBIC 16 further includes an LBUS to XLBUS (LUX) interface 86 having a plurality of bidirectional terminals, only one of which is shown at 90, a 10-base T interface data port 92 and a clock input 94. The bidirectional terminals 90 are connected to the XLBUS 34 to communicate with the MIX 62 in the DLIC 40. Separate terminals (90) are in communication with respective XLBUSes 34, 36, 38, etc., and DLICS 40, 42, 44, etc., in a similar manner. Thus, the LUX 86 and MIX 62 act as a second pair of transceivers for transceiving data on the common communications link.

The 10 base T interface data port 92 is in communication with dual ported memory 96, which it uses to pass data to and from a communications processor 98, also on the DBIC 16. The communications processor 98 is in communication with the 10 base T data network which is located remotely from the shelf.

The X-24 scan ASIC 76 provides for transmission of voice data between the DLICs 40, 42, 44, etc., and the DBIC, on successive XLBUSes 34, 36, 38, etc., at regular intervals of time. To do this, the X-24 scan ASIC 76 successively transmits a scan message on successive XLBUSes 34, 36, 38, etc., at regular intervals of time. Respective codecs (58) on respective DLICs 40, 42, 44, etc., respond to their respective scan messages with respective response messages. In this embodiment, a scan message is transmitted on any given XLBUS 34, 36, 38, etc., each 125 uS. Thus, whether or not a telephone call is in progress, each DLIC 40, 42, 44, etc., receives a scan message once each 125 uS. A DLIC frame is, therefore, defined once each 125 uS.

Figure 3:
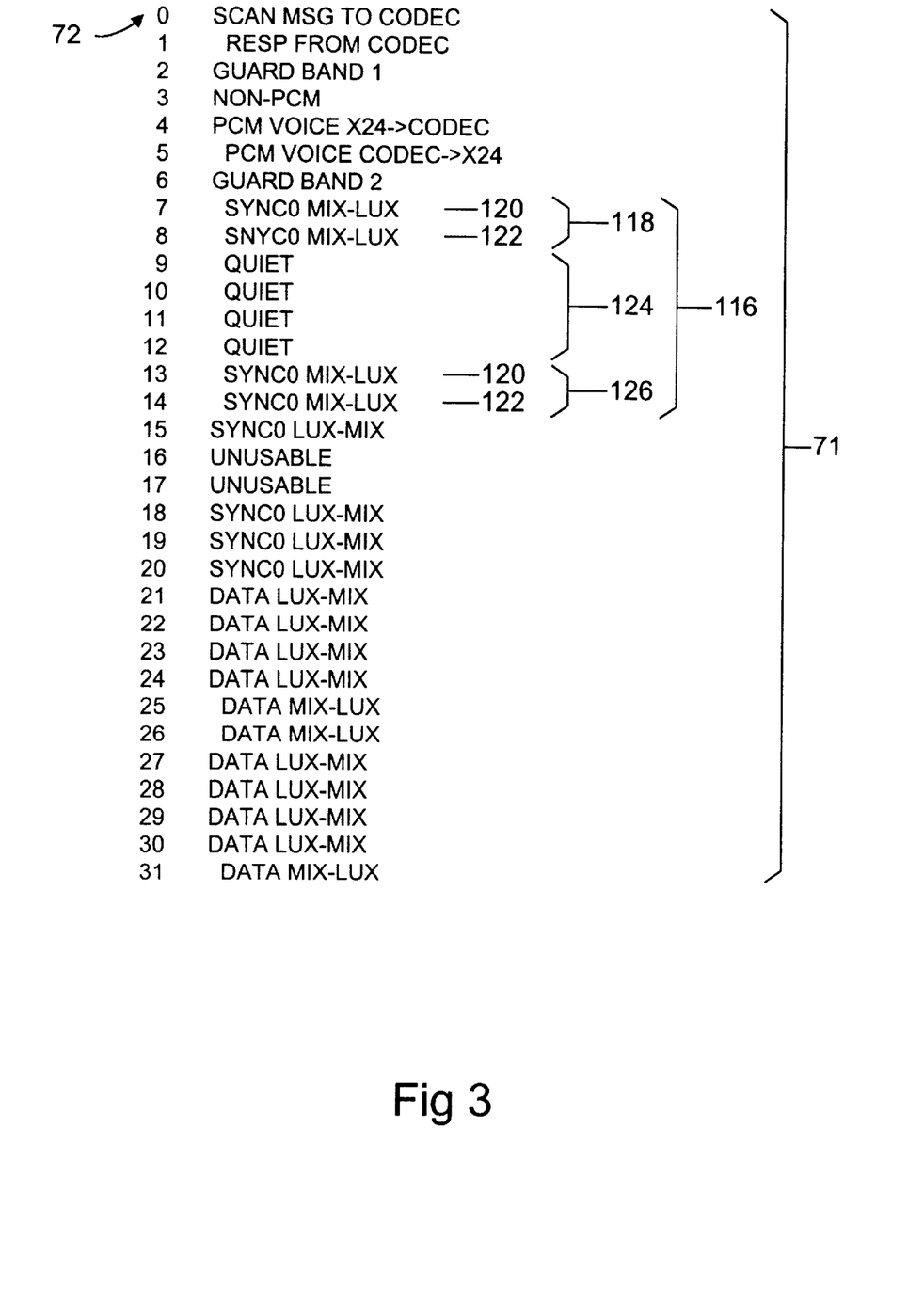
FIG. 3 is a timing diagram illustrating time slots on a bus according to the first embodiment of the invention.

FIG. 3

Referring to FIG. 3, each frame 71 is considered to have 32 equal length time slots 72 labelled 0–31, during which data transactions may occur. Some of the time slots may be designated unusable, while the remaining time slots are designated useable. In this embodiment, time slots 16 and 17 are designated unusable, time slot 3 is designated unusable for PCM transmissions, but useable for data. Three time slots, time slots 0–2 are designated for scan messages and are not available for data transfer. Time slots, 3–15 and 18–31 are therefore designated useable for data transfer. No data is transferred during unusable time slots. Each XLBUS may be associated with a different set of unusable time slots.

Voice data transfer between a DLIC 14 and the DBIC 16 requires only 3 time slots of the entire 32 available. In this embodiment, three time slots, time slots 4 and 5, are used for PCM voice data, with time slot 4 being used for transmission from the DBIC 16 to the DLIC 14 and time slot 5 being used for transmissions from the DLIC 14 to the DBIC 16. Time slot 6 is used as a guardband. Therefore there are up to 32−2(unusable)−3(scan)−3(PCM voice)=24 time slots which may be available for use. Without the 3 PCM voice time slots, there are 27 time slots available. The invention includes transferring data in these 24 or 27 time slots.

Figure 4:
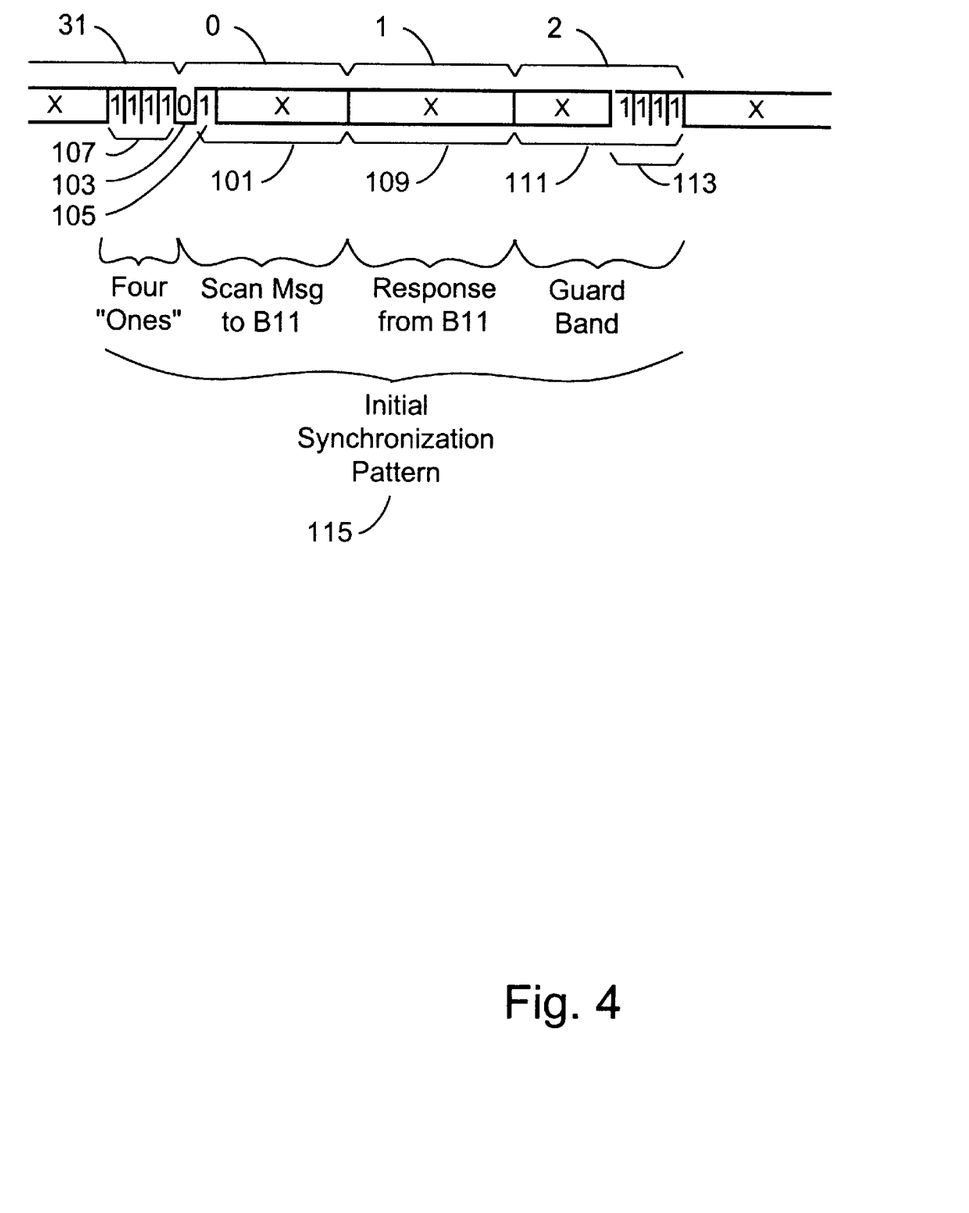
FIG. 4 is a schematic representation of an initial synchronization pattern according to the first embodiment of the invention.

FIG. 4

Referring to FIGS. 2, 3 and 4, during normal, non-data operation the X-24 scan ASIC 76 transmits a predefined scan message 101 including 10 bits, the first two of which are a start bit 103 and a mode bit 105 respectively. In this embodiment, these bits are 0 and 1 respectively. Referring back to FIG. 3, before any data is communicated in any of the 24 available or idle time slots, each of these 24 time slots will be inactive. Therefore, in the time slot (31) immediately preceding the time slot (0) in which the scan message is transmitted, the state of the XLBUS is fixed to an inactive value, which in this embodiment is logic "1". Therefore, before the scan message is transmitted and before any data is transferred, it is known that in the time slot (31) immediately preceding the scan message 101, there will be at least four initial bits 107 having the value 1.

After the scan message 101 is transmitted, the code 58 transmits a response message 109 within time slot (1) immediately following the time slot (0) of the scan message 101 and a guard band 111 follows in the time slot (2) immediately following the response message 109. The guard band 111 is defined as a period of inactivity on the XLBUS 34, and therefore the guard band 111 necessarily has at least four final bits 113 having the value 1.

Thus, before any data is transferred on the XLBUS 34, a frame delimiter can be identified by an initial synchronization pattern 115 including the four initial bits 107, the scan message 101 and the four final bits 113 in the guard band 111.

In this embodiment, following the guard band in time slot 2, no activity occurs during time slot 3.

Voice data transactions occur in time slots 4 and 5, followed by a second guard band time slot in time slot 6.

Referring back to FIG. 2, in order to transfer 10 base T data across a given XLBUS 34, the LUX 86 in the DBIC 16 and the MIX 62 in the DLIC 40 have respective synchronization state machines, 117 and 119 respectively. These state machines are pre-programmed with the identities of unusable time slots 0–2, and 16–17.

Figure 5:
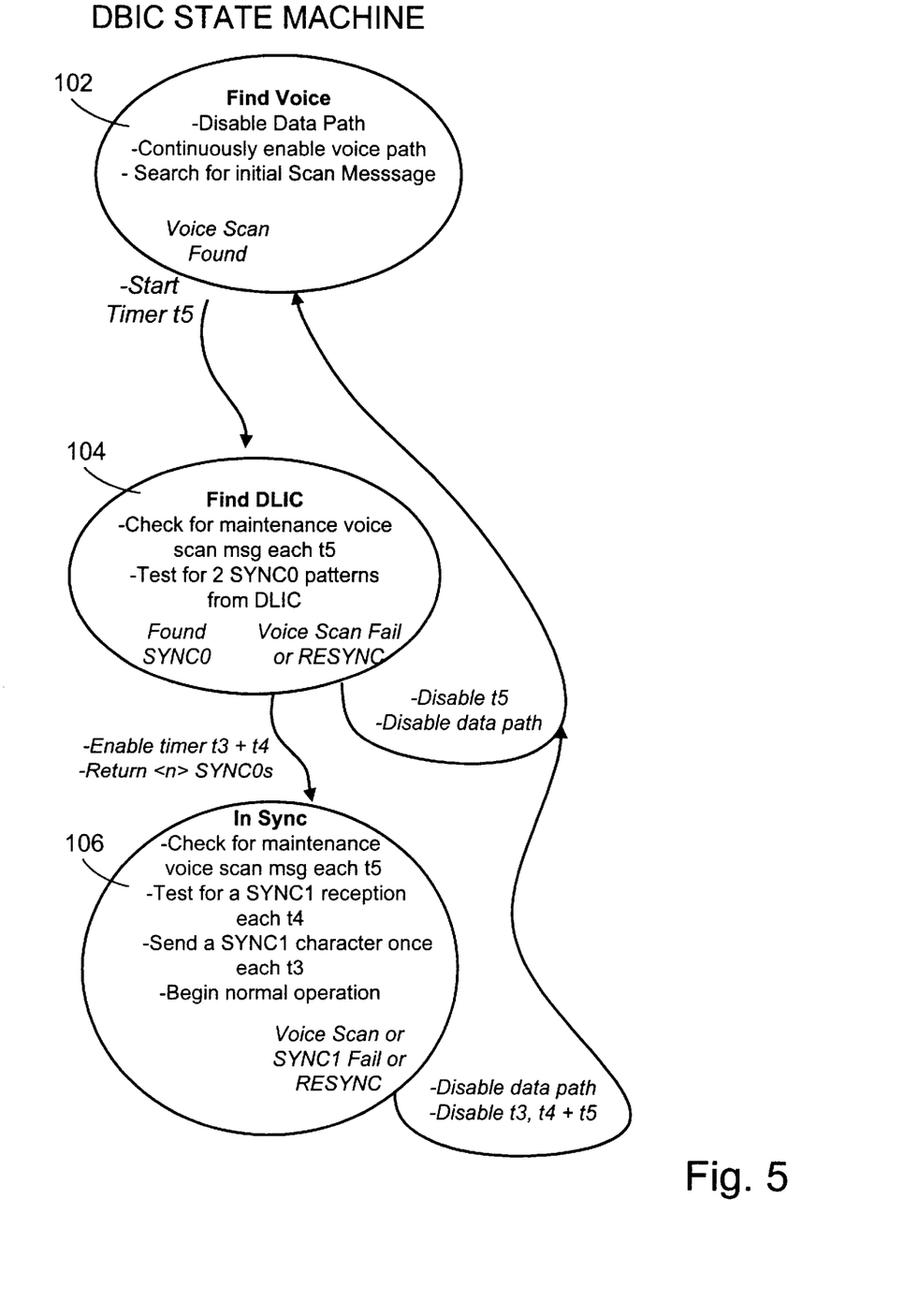
FIG. 5 is a state diagram of a data bus interface card state machine according to the first embodiment of the invention.
Figure 6:
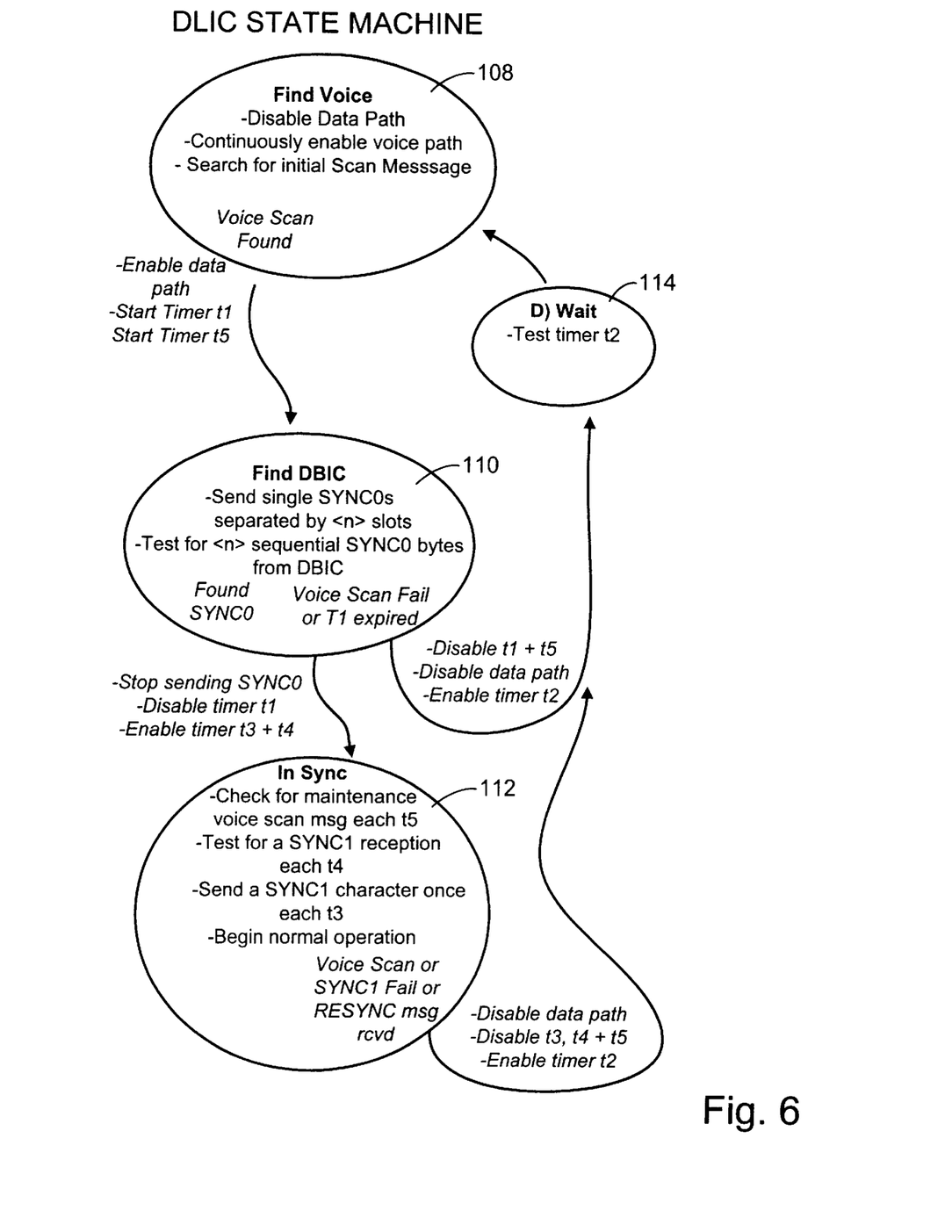
FIG. 6 is a state diagram of a data line interface card state machine according to the first embodiment of the invention.

FIGS. 5 and 6

Referring to FIGS. 2 and 5, the DBIC state machine 117 is programmed to move between a DBIC FIND VOICE state 102, a FIND DLIC state 104 and a DBIC IN SYNC state 106. Referring to FIGS. 2 and 6, similarly, the DLIC state machine 119 is programmed to move between a DLIC FIND VOICE state 108, a FIND DBIC state 110, a DLIC IN SYNC state 112 and a wait state 114.

DBIC Find Voice State

Referring to FIGS. 2 and 5, in the DBIC FIND VOICE state 102, data communications between the XLBUS 34 and the 10 base T circuit 32 are disabled and the voice path provided by the X-24 scan ASIC 76 is continuously enabled. Also in this state, the DBIC state machine 117 continually monitors the XLBUS 34, looking for the initial sync pattern 115 shown in FIG. 4.

When the initial sync pattern 115 is detected, the DBIC state machine 117 starts a first timer (not shown) to identify time slot boundaries, and enters the Find DLIC state 104. By identifying the time slot boundaries and by knowing the identities of unusable time slots the DBIC state machine acts as a monitor for monitoring the common communications link to identify idle periods from which data associated with the first pair of transceivers is not present, the idle periods being the unused time slots 3–15 and 18–31. In addition, the DBIC state machine 117 acts as a detector for detecting an initial synchronization pattern on the common communications link.

DLIC Find Voice State

Referring to FIGS. 2 and 6, in the DLIC Find Voice State 108, the DLIC state machine 119 is programmed to set the tristatable output 66 to receive while the output 60 associated with the voice path is continuously enabled. The DLIC state machine 119 is also programmed to monitor the XLBUS 34 to look for the initial sync pattern 115, to start second and third timers (not shown), to set the tristatable output 66 to transmit and to enter the find DBIC state 110 upon finding the initial sync pattern 115. Thus, the DLIC state machine 119 also acts as a monitor and a detector for detecting an initial synchronization pattern. It will be noted that each transceiver of the second pair of transceivers includes a monitor.

FIND DBIC State

Still referring to FIGS. 2, 3 and 6, in the find DBIC state 110, the DLIC state machine 119 includes a transmitter for transmitting to the DBIC state machine 117 a bandwidth allocation message, shown generally at 116 in FIG. 3. In this embodiment, the bandwidth allocation message includes a first upstream indicator (m) 118 which acts as a first synchronization message. In this embodiment, the first synchronization message includes first and second predefined commands including synchronization commands 120 and 122, each command being transmitted in a respective time slot, in this case time slots 7 and 8. This is followed by a downstream indicator represented by a number (n) of quiet time slots 124. This is followed by a second upstream indicator 126 which acts as a second synchronization message including a repeat of the first and second predefined commands 120 and 122. Thus, two time slots (7 and 8) are used to transmit the first upstream indicator 118, or first synchronization message then the DLIC state machine 119 waits for a number (n) (in this embodiment four) of quiet time slots (time slots 9–12), defining the downstream indicator and then transmits a second upstream indicator 126 or second synchronization message including another set of first and second predefined commands 120 and 122 (in time slots 13 and 14). Thus, the transmitter transmits first and second synchronization messages in respective time slots separated by n quiet time slots. In this embodiment, each command message 120 and 122 will hereinafter be called a SYNC0 command. The SYNC0 command is merely a predefined 10 bit sequence.

The ratio of the number of quiet time slots 124 to the number of SYNC0 messages in the first upstream indicator is used to identify the ratio of the number of time slots allocated to the LUX 86 to the number of time slots allocated to the MIX 62 in subsequent data transactions. In other words, the ratio identifies the ratio of upstream to downstream proportionment of bandwidth for the transfer of 10 base T data in subsequent data transactions between the DBIC 16 and the DLIC 40.

Thus, at least one transceiver, which in this embodiment is the DLIC state machine 119, acts as a transmitter or transmitting means for transmitting a synchronization message on the common communication link, the transmitter transmitting the first synchronization message during idle periods on the common communications link. It may be said that the transmitter transmits a second synchronization message within a pre-determined time after transmitting the first synchronization message, the predetermined time being the quiet time slots. The DLIC state machine 119 thus acts to synchronize the transceivers of the second pair of transceivers.

After sending the bandwidth allocation message 116, the DLIC state machine 119 monitors the XLBUS 34 for a synchronization reply message transmitted by the DBIC. Successful detection of a reply synchronization message at the DLIC state machine 119 is deemed to have occurred when 4 sequential reply synchronization messages are received from the DBIC within a pre-determined amount of time, which, in this embodiment, is 125 uS. In this embodiment, the reply synchronization messages are also SYNC0 commands. The number 4 is chosen to signal the DLIC state machine that the number of unused time slots counted by the DBIC in the bandwidth allocation message is 4. Thus, the DLIC state machine 119 also acts as a detector for detecting n sequential reply synchronization messages during the idle periods and determining a value for n. The DLIC state machine 119 compares the number n of said sequential reply synchronization messages received from the DBIC with the number of quiet time slots between the first and second synchronization messages to determine whether or not the number n is equal to the number of quiet time slots between the first and second synchronization messages. Equality indicates synchronization of the pair of transceivers non-equality indicates lack of synchronization. Thus, the second transceiver acts as a detector and a processor.

Figure 7:
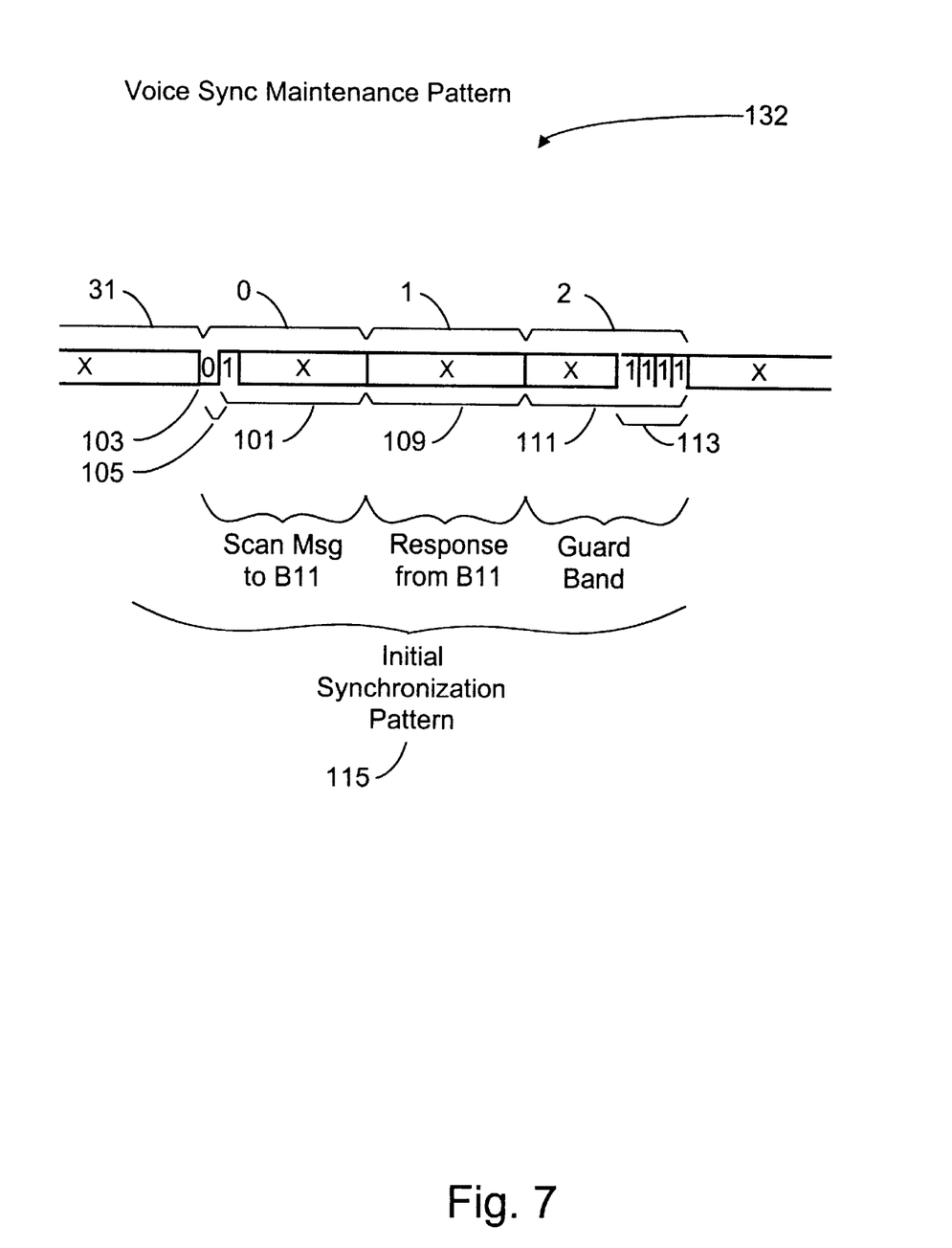
FIG. 7 is a schematic representation of a voice synchronization maintenance pattern according to the first embodiment of the invention.

FIG. 7

The DLIC state machine 119 also monitors the XLBUS 34 for a voice sync maintenance pattern every 125 uS.

Referring to FIG. 7, the voice sync maintenance pattern is shown generally at 132 and is similar to the initial synchronization pattern 115 shown in FIG. 4 with the exception that it does not include the initial bits 107. This is because, when data is being transferred, the time slot (31) immediately preceding the scan message 101 transmitted by the X-24 may be used to carry such data. In such an embodiment, it cannot be guaranteed that the initial bits 107 will be present. Hence, the voice sync maintenance pattern 132 includes a scan message 101 including the start bit 103 and the mode bit 105, and the final bits 113 at the end of the guard band 111.

WAIT State

Referring back to FIGS. 2 and 6, if a voice sync maintenance pattern (132) is not received 125 uS after the initial sync pattern (115) was received or the last voice sync maintenance pattern (132) was received, or if no SYNC0 commands are received back from the DBIC 16, the DLIC state machine 119 disables the tristatable output 66, disables the first and second timers and enters the WAIT state 114. The WAIT state 114 is a 500 uS delay state. This state reduces the impact of synchronization problems on voice data transactions and provides for sufficient time to allow the state machines to re-synchronize to each other. Upon completion of the WAIT state 114, the DLIC state machine 119 is returned to the DLIC FIND VOICE state 108 as described above.

In the event of a system problem which implies the need for the X-24 and code to re-synchronize, it is crucial to stop all data transactions as soon as possible to allow the voice components to re-synchronize to each other. Even if the voice components do not lose sync to each other but the MIX loses sync with the voice transactions, some voice transactions are guaranteed to be corrupted since the MIX will be taking over the bus at the wrong times. The delay thus causes the other state machine (DBIC) to also lose sync. Thus, the loss of synchronization at the DLIC is communicated to the DBIC.

FIND DLIC

Referring to FIGS. 2, 3 and 5, the FIND DLIC state 104 is assumed by the DBIC state machine 117 on exiting the DBIC FIND VOICE state 102 described above with respect to the DBIC 16. In the FIND DLIC state 104, the DBIC state machine 117 monitors the XLBUS 34 for the first upstream indicator 118 of SYNC0 messages transmitted by the DLIC state machine 119 when that state machine is in the FIND DBIC state 110 shown in FIG. 6.

On detecting the first upstream indicator 118 of SYNC0 messages, the DBIC state machine 117 monitors the XLBUS 34 to determine the number (n) of quiet time slots 124 until the second pair 126 of SYNC0 messages is received. The DBIC state machine 117 stores the number of quiet time slots in memory (not shown). Thus, the DBIC state machine acts as a detector for detecting the first and second synchronization messages and the pre-determined time between the first and second synchronization messages.

In addition, the DBIC state machine 117 monitors the XLBUS 34 for a voice sync maintenance pattern (132) every 125 uS as described above with respect to the DBIC FIND VOICE state 102.

If the voice sync maintenance pattern 132 is not received within 125 uS of the initial sync pattern or the voice sync maintenance pattern 132, the first timer (not shown) is disabled, the bidirectional terminal 90 is set to receive and the DBIC state machine 117 is placed back in the DBIC FIND VOICE state 102.

If however, the first upstream indicator 118 and 126 of sync0 messages were successfully received, fourth and fifth timers (not shown) are started and reply synchronization messages, which in this embodiment, include four SYNC0 messages are transmitted, on the XLBUS 34 by the LUX 86, in succession, to the DLIC 40. In this embodiment, these SYNC0 messages are transmitted in time slots 15 and 18–20. The DBIC state machine 117 is then placed in the DBIC IN-SYNC state 106. Thus, the DBIC state machine 117 acts as a transmitter in at least one of the transceivers which transmits n sequential reply synchronization messages during the idle periods.

Referring back to the DLIC state diagram of FIG. 6, if the (n) SYNC0 messages are successfully received from the DBIC 16, the DLIC state machine 119 disables the second timer (not shown) and enables sixth and seventh timers and enters the DLIC IN-SYNC state 112.

DBIC IN-SYNC state

Referring to FIGS. 2 and 5, when the DBIC 16 is in the DBIC IN-SYNC state 106, data can be exchanged between the DBIC 16 and the DLIC 40. Thus, the LUX 86 and MIX 62 act as a second pair of transceivers for transceiving data on the common communications link during idle periods and the DBIC state machine 117 and the DLIC state machine 119 together act as a synchronizer or synchronizing means for synchronizing data transceivers of the second pair of transceivers for communications therebetween.

Figure 8:
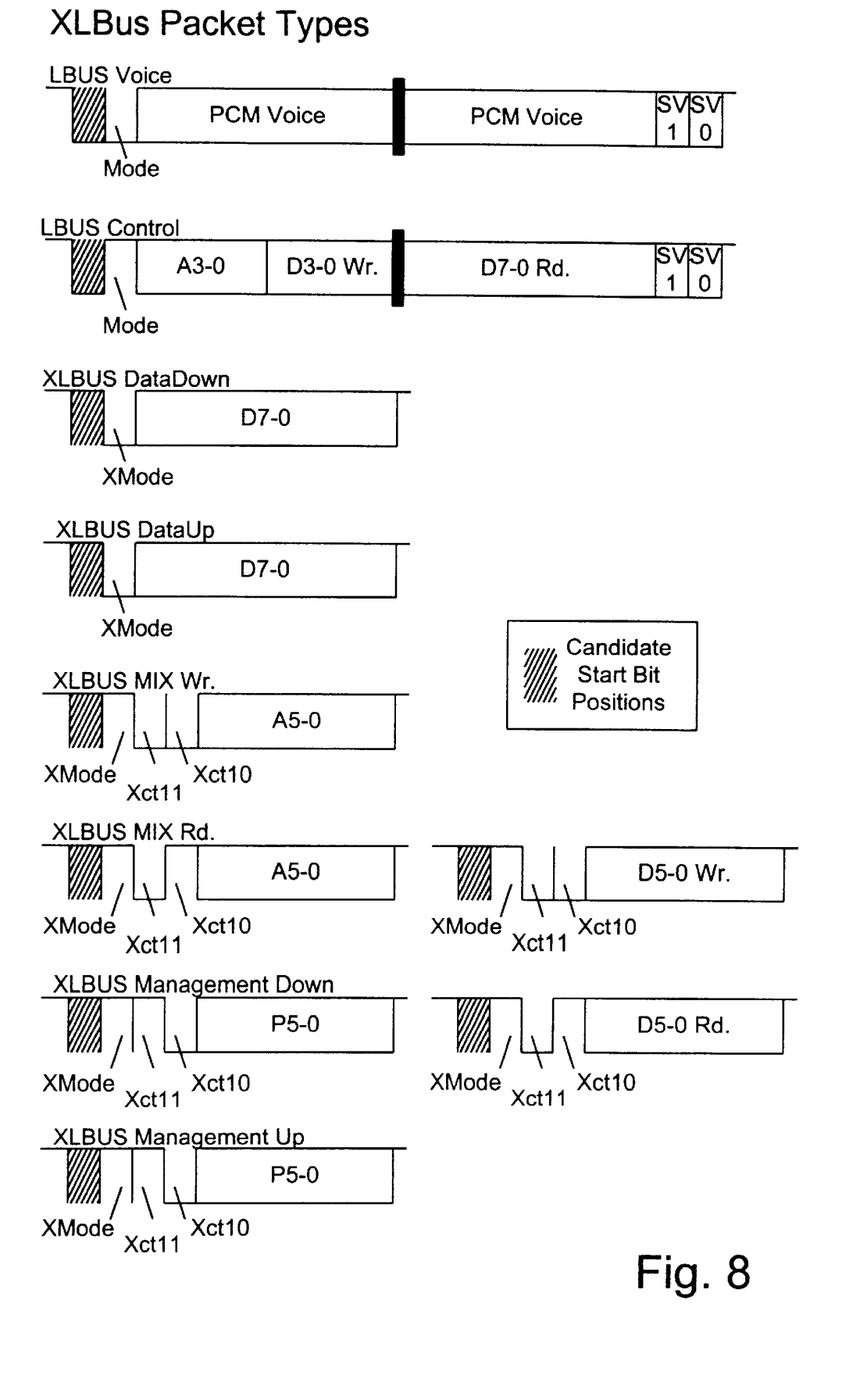
FIG. 8 is a schematic representation of various messages operable to be transmitted across the bus shown in FIG. 5.

The exchange of data between the DBIC and the DLIC includes the exchange of data communicated on the analog subscriber loop 48 and commands recognizable by the DBIC and DLIC state machines 117 and 119. These commands allow the DBIC state machine 117 to write to registers in the MIX 62 or read from registers in the MIX 62, to transfer data between the DBIC 16 and the MIX 62, to send management data between the DBIC 16 and the MIX 62 and to send control data from the DBIC 16 to the MIX 62. Data packet types for these transactions are shown in FIG. 8.

Referring to FIGS. 2 and 3, data packets for communication between the DBIC state machine 117 and the DLIC state machine 119 are conducted in the ratio specified by the number of quiet time slots 124 detected by the DBIC 16 in the FIND DLIC state 104. Data packets are only transmitted in useable time slots and therefore data transactions occurring across unusable time slots use time slots on opposite sides of such unusable time slots. In the embodiment shown, four time slots (21–24) are used to conduct data from the DBIC down to the DLIC while two time slots (25 and 26) are used to conduct data from the DLIC up to the DBIC. This pattern of four down and two up is repeated across the remainder of the frame and into successive frames. Unusable time slots cause data transmissions to be deferred until useable time slots in each frame.

Referring to FIGS. 2 and 5, while the DBIC state machine 117 is in the DBIC IN-SYNC state 106, in addition to transmitting and receiving data packets, it monitors the XLBUS 34 for a voice sync maintenance pattern (132) as shown in FIG. 7, and a sync maintenance message, which will be referred to hereinafter as a SYNC1 command, at least once every 375 uS. It also transmits a SYNC1 command once every 250 uS.

The SYNC1 command is predefined and includes 10 bits which are transmitted in a single time slot.

In the event that a voice sync maintenance pattern (132) is not detected once each 125 uS, or a SYNC1 command is not detected each 375 uS, the DBIC state machine 117 disables the data path by setting its bidirectional terminal 90 to receive and disables its timers and returns to the DBIC FIND VOICE state 102.

DLIC IN-SYNC State

Referring to FIGS. 2 and 6, when the DLIC 40 is in the DLIC IN-SYNC state 112, data can be exchanged between the DLIC 40 and the DBIC 16 using data packets as described above.

While the DLIC state machine 119 is in the DLIC IN-SYNC state 112, in addition to transmitting and receiving data packets, it also monitors the XLBUS 34 for a voice sync maintenance pattern shown in FIG. 7 at 132 every 125 uS, as described above with respect to the DLIC FIND VOICE state 108. It also monitors the XLBUS 34 for a SYNC1 command at least once every 375 uS. It also transmits a SYNC1 command once every 250 uS.

In the event that a voice sync maintenance pattern (132) is not detected once each 125 uS, or a SYNC1 command is not detected each 375 uS, the DLIC state machine 119 disables the data path by tristating the tristatable output 66 and disables all of its timers except the fifth timer and enters the WAIT state 114, where it functions as described in connection with the WAIT state 114. Thus, at least one of the transceivers transmits a synchronization maintenance message on the common communications link and the transceivers of the second pair transmit and receive data on the common communications link while periodically detecting a synchronization maintenance message on the common communications link. At least one of the transceivers of the second pair determines whether or not the synchronization maintenance message is received at periodic intervals of a first duration and data and the synchronization maintenance message are interleaved.

During the Find DBIC state and the Find DLIC state, an initial bandwidth partitioning is established by the DLIC as described above. In particular, when the DBIC is attempting to detect the presence of a DLIC, the bandwidth opportunities to be used by the DBIC are implied to be those unused by both the DLIC and the voice path.

It is expected an initial 5:1 bandwidth partitioning of the XLBUS may be adequate to support all modem initialization and operational requirements. However, should a different partitioning be required, the facility exists to alter this on the fly via a defined set of XLBUS Protocol Codes which may be communicated from the communications processor 98 through the LUX 86 to the MIX 62. In order to change the bandwidth partitioning from the default 5:1, the DBIC must send an appropriate XLBUS Management Packet. Although a wide range of bandwidth partitions are possible only those appropriate to a particular line card design need be supported by that card. The DBIC, however, must support the full range, for any line card.

In the upstream direction, the average XLBUS bandwidth is chosen such that it exceeds that of the link. As a result, the only buffering required in the MIX 62 for this direction is a minimal amount (a few bytes) to handle delays due to transfers between clock domains, and XLBUS interface latency. In addition, the frame processing on the DBIC has the capacity to handle the full upstream rate, so no flow control is required.

In the downstream direction the objective is to ensure the link capacity is 100 percent utilized whenever possible. The ability of both the DBIC to generate payload, and the XLBUS 34 to carry it is greater than the link capacity. As a result, both downstream flow control and buffering are required. A trade-off exists between buffer size on the line card, and the amount of XLBUS upstream bandwidth consumed by flow control (note that to control the downstream path, upstream bandwidth is consumed). As the buffers on the line card are increased in size, flow control events occur less frequently, and therefore, waste less XLBUS bandwidth. In addition to the upstream bandwidth available for flow control, the latency in the path to respond to flow control events also increases buffering requirements.

The above bandwidth partitioning assumes simultaneous telephony and data service. During intervals when no telephony is occurring, the XLBUS rates will be about 10 percent greater in both directions. A slight asymmetry in bandwidth may exist between the two directions for corresponding ratios because flow control information travels only from the DLIC to the DBIC.

Flow control across the XLBUS 34 is required only in the downstream direction. The "FLOW_GO" and "FLOW_STOP" XLBUS management packets are used to start and stop the downstream data at the LUX. A flow control packet will be originated as "high water" and "low water" marks are reached in a MIX buffer (not shown) in the MIX.

A timer function is employed in the LUX 86 in order to insure that should a "FLOW_GO" packet be lost on the XLBUS 34 that the processor is notified within a reasonable amount of time.

In order to allow delineation of data being received or transmitted, Start of Frame (SOF) and End of Frame Good & Bad (EOFG & EOFB) markers (not shown) are used to flag the beginning and end of frames. The end of frame marker also communicates the status of the frame as result of CRC calculations. In the upstream direction, the EOFG and EOFB markers are used to help delineate the data so that it can be properly processed when being sent out of the DBIC on the ethernet port. In the downstream direction, the SOF and EOFG flags are sent to the DLIC to allow it to insert frame delineation markers before sending the data down the loop.

The XLBUS bytes are protected by a CRC-8 covering all bytes, including control byes, found between the SOF and EOF markers. The CRC-8 value is inserted just before the EOF marker. This is done in both upstream and downstream frames. If the LUX 86 receives a frame with a bad CRC, it flags it so that it can be discarded. If the MIX 62 receives a frame with a bad CRC, it issue a frame abort command in an HDLC frame on the analog loop so the X-Port can discard the frame.

Effectively, the apparatus may be used to upgrade existing Line Concentrating Modules (LCM), to provide high speed ethernet access over twisted pair without affecting voice communications. The LCM is upgraded by replacing the Bus Interface Card (BIC) with a Data Bus Interface Card (DBIC) and the normal voice line card with Data Line Interface Cards (DLIC). A proprietary unit at the customer's premise is required (X-Port) to split the voice and data channels and to provide the recovered data to a computer over a 10 base T interface.

Non-data line cards can continue to communicate with the X-24 over the LBUS unhindered ensuring backwards compatibility with the existing legacy of line cards.

Effectively, the invention provides a way to allow voice transactions to be communicated undisturbed while unused time slots are used to pass data. This "time slot stealing" mechanism uses a voice Start Bit to determine time slot boundaries. Once this is done, the first bit of every time slot can be tested for a start bit to determine if that time slot is being used for voice transactions. The detection of a start bit implies that the present time slot and the following two are used for voice communication. If the start bit tested is a "1" rather than a "0", this means that the present time slot is not being used for voice communication and can be used for data communication.

While specific embodiments of the invention have been described and illustrated, such embodiments should be considered illustrative of the invention only and not as limiting the invention as construed in accordance with the accompanying claims.

What is claimed is:

1. A method of communicating data between first and second pairs of transceivers communicating on a common communications link, the method comprising the steps of:
    a) monitoring said common communications link to identify idle periods in communications between transceivers of said first transceiver pair;
    b) synchronizing transceivers of said second pair of transceivers, for communication with each other; and
    c) causing the second pair of transceivers to use the idle periods determined by monitoring, for conducting communications therebetween.

2. A method as claimed in claim 1 wherein the step of monitoring includes the step of detecting an initial synchronization pattern on said common communications link.

3. A method as claimed in claim 1 wherein the step of synchronizing includes the step of transmitting a first synchronization message on said common communication link.

4. A method as claimed in claim 3 further including the step of transmitting said first synchronization message during said idle periods.

5. A method as claimed in claim 4 further including the step of transmitting a second synchronization message a pre-determined time after transmitting said first synchronization message.

6. A method as claimed in claim 5 further including the step of detecting said first and second synchronization messages and said pre-determined time between said first and second synchronization messages.

7. A method as claimed in claim 5 further including the step of transmitting n sequential reply synchronization messages during said idle periods.

8. A method as claimed in claim 7 further including the step of detecting said n sequential reply synchronization messages during said idle periods and determining a value for n.

9. A method as claimed in claim 7 further including the step of transmitting said first and second synchronization messages in respective time slots separated by n quiet time slots.

10. A method as claimed in claim 9 further including the step of detecting said n sequential reply synchronization messages during said idle periods and determining a value for n.

11. A method as claimed in claim 9 further including the step of comparing the number n of said sequential reply synchronization messages received with the number of said quiet time slots between said first and second synchronization messages to determine whether or not the number n is equal to the number of quiet time slots between said first and second synchronization messages, wherein equality indicates synchronization of said second transceiver with said first transceiver and non-equality indicates lack of synchronization.

12. A method as claimed in claim 1 wherein the step of establishing communications between said transceivers of said second pair of transceivers includes the step of transmitting and receiving data on said common communications link while periodically detecting a synchronization maintenance message on said common communications link.

13. A method as claimed in claim 12 wherein the step of periodically detecting said synchronization maintenance message includes the step of determining whether or not said synchronization maintenance message is received at periodic intervals of a first duration.

14. A method as claimed in claim 13 further including the step of transmitting a synchronization maintenance message on said common communications link.

15. An apparatus for communicating data on a common communications link, the apparatus comprising:
    a) a first pair of transceivers communicating with each other on said common communications link at pre-defined intervals of time;
    b) a monitor for monitoring said common communications link to identify idle periods during which data associated with said first pair of transceivers is not present;
    c) a second pair of transceivers for transceiving data on said common communications link during said idle periods; and
    d) a synchronizer for synchronizing data transceivers of said second pair for communications therebetween.

16. An apparatus as claimed in claim 15 wherein said monitor includes a detector for detecting an initial synchronization pattern on said common data link.

17. An apparatus as claimed in claim 16 wherein said second transceiver includes said monitor.

18. An apparatus as claimed in claim 15 wherein said synchronizer includes a transmitter for transmitting a synchronization message on said communication link.

19. An apparatus as claimed in claim 18 wherein at least one transceiver of said second pair of transceivers includes said synchronizer.

20. An apparatus as claimed in claim 18 wherein at least one transceiver of said second pair of transceivers includes said transmitter.

21. An apparatus as claimed in claim 20 wherein said transmitter transmits said first synchronization message during said idle periods.

22. An apparatus as claimed in claim 21 wherein said transmitter transmits a second synchronization message a pre-determined time after transmitting said first synchronization message.

23. An apparatus as claimed in claim 22 further including a detector for detecting said first and second synchronization messages and said pre-determined time between said first and second synchronization messages.

24. An apparatus as claimed in claim 22 wherein said transmitter transmits n sequential reply synchronization messages during said idle periods.

25. An apparatus as claimed in claim 24 further including a detector for detecting said n sequential reply synchronization messages during said idle periods and determining a value for n.

26. An apparatus as claimed in claim 24 wherein said transmitter transmits said first and second synchronization messages in respective time slots separated by n quiet time slots.

27. An apparatus as claimed in claim 26 wherein said detector detects said n sequential reply synchronization messages during said idle periods and determining a value for n.

28. An apparatus as claimed in claim 26 further including a processor for comparing the number n of said sequential reply synchronization messages received with the number of said quiet time slots between said first and second synchronization messages to determine whether or not the number n is equal to the number of quiet time slots between said first and second synchronization messages, wherein equality indicates synchronization of said second transceiver with said first transceiver and non-equality indicates lack of synchronization.

29. An apparatus as claimed in claim 28 wherein said second transceiver includes said detector and said processor.

30. An apparatus as claimed in claim 29 wherein said data and said sync maintenance message are interleaved.

31. An apparatus as claimed in claim 15 wherein at least one of said transceivers transmits a synchronization maintenance message on said common communications link.

32. An apparatus as claimed in claim 31 wherein said transceivers of said second pair transmit and receive data on said common communications link while periodically detecting a synchronization maintenance message on said common communications link.

33. An apparatus as claimed in claim 32 wherein said transceiver of said second pair determines whether said synchronization maintenance message is received at periodic intervals of a first duration.

34. An apparatus for communicating data between first and second pairs of transceivers communicating on a common communications link, the apparatus comprising:
   a) means for monitoring said common communications link to identify idle periods in communications between transceivers of said first transceiver pair;
   b) means for synchronizing transceivers of said second pair of transceivers, for communication with each other; and
   c) means for causing the second pair of transceivers to use the idle periods determined by monitoring, for conducting communications therebetween.

35. An apparatus as claimed in claim 34 wherein said monitoring means includes means for detecting an initial synchronization pattern on said common communications link.

36. An apparatus as claimed in claim 34 wherein said synchronizing means includes means for transmitting a synchronization message on said communication link.

37. An apparatus as claimed in claim 36 wherein said means for transmitting is operable to transmit said synchronization message during said idle periods.

38. An apparatus as claimed in claim 37 further including means for transmitting a second synchronization message a pre-determined time after transmitting said first synchronization message.

39. An apparatus as claimed in claim 38 further including means for detecting said first and second synchronization messages and said pre-determined time between said first and second synchronization messages.

40. An apparatus as claimed in claim 38 further including means for transmitting n sequential reply synchronization messages during said idle periods.

41. An apparatus as claimed in claim 40 further including means for detecting said n sequential reply synchronization messages during said idle periods and determining a value for n.

42. An apparatus as claimed in claim 40 further including means for transmitting said first and second synchronization messages in respective time slots separated by n quiet time slots.

43. An apparatus as claimed in claim 42 further including means for detecting said n sequential reply synchronization messages during said idle periods and determining a value for n.

44. An apparatus as claimed in claim 42 further including means for comparing the number n of said sequential reply synchronization messages received with the number of said quiet time slots between said first and second synchronization messages to determine whether or not the number n is equal to the number of quiet time slots between said first and second synchronization messages, wherein equality indicates synchronization of said second transceiver with said first transceiver and non-equality indicates lack of synchronization.

45. An apparatus as claimed in claim 34 wherein said means for establishing communications between said transceivers of said second pair of transceivers includes means for transmitting and receiving data on said common communications link while periodically detecting a synchronization maintenance message on said common communications link.

46. An apparatus as claimed in claim 45 wherein means for periodically detecting said synchronization maintenance message includes means for determining whether or not said synchronization maintenance message is received at periodic intervals of a first duration.

47. An apparatus as claimed in claim 46 further including means for transmitting a synchronization maintenance message on said common communications link.

48. A method of combining data from first and second separate data transceivers onto a common data link, the method comprising the steps of:
   a) transceiving data at said first data transceiver using said common communications link, at regular intervals of time;
   b) monitoring said common communications link to identify idle periods during which data associated with said first data transceiver is not present;
   c) synchronizing said second data transceiver with a corresponding transceiver in communication with said common communications link; and
   d) causing the second data transceiver to use the idle periods determined by monitoring, for conducting communications with said corresponding transceiver.

49. An apparatus for communicating data on a common data link, the apparatus comprising:
   a) a first data transceiver for transceiving data on said common communications link at regular intervals of time;
   b) a monitor for monitoring said common communications link to identify idle periods during which data associated with said first data transceiver is not present;
   c) a second data transceiver for transceiving data on said common communications link during said idle periods; and
   d) a synchronizer for synchronizing said second data transceiver with a corresponding transceiver in communication with said common communications link.

* * * * *